United States Patent Office 3,629,339
Patented Dec. 21, 1971

3,629,339
STABILIZATION OF PHENOLS
Hans L. Schlichting, Spartanburg, S.C., and Ellis I. Lichtblau, Kenmore, N.Y., assignors to Hooker Chemical Corporation, Niagara Falls, N.Y.
No Drawing. Continuation-in-part of application Ser. No. 510,681, Nov. 30, 1965. This application Mar. 28, 1969, Ser. No. 811,674
Int. Cl. C07c 39/00
U.S. Cl. 260—621 A    20 Claims

ABSTRACT OF THE DISCLOSURE

An inorganic trivalent arsenic compound, present in a stabilizing proportion, can be used to stabilize phenol, unsubstituted polyhydric monocyclic phenols, unsubstituted fused ring phenols, unsubstituted alkylidene linked bisphenols, their lower alkyl derivatives, and their halogenated derivatives, against deterioration in color and odor with age, provided it is substantially soluble, does not discolor the phenol and must not create a visibly turbid appearance in the concentrations used. It can be used in combination with other stabilizers.

---

This is a continuation-in-part of application Ser. No. 510,681, filed Nov. 30, 1965, now abandoned.

This invention relates to the stabilization of phenol ($C_6H_5OH$), halophenols, alkylphenols and related products. More particularly, this invention relates to a method for improving the resistance of said compounds against deterioration in color and odor with age and to compounds effective as stabilizers for them.

It is well known that phenols are susceptible to oxidation which usually occurs by exposure to the air, as a result of which highly colored compounds and compounds having an unpleasant odor are formed. The formation of these impurities is accelerated by a variety of factors, such as trace impurities of metals, metal oxides, caustic, acids, and also sunlight, and so forth. Since the commercial value of phenols is often dependent upon absence of color and of unpleasant odor, it is important to provide means to prevent or greatly minimize the development of these deleterious features.

Numerous compounds have heretofore been claimed as effective inhibitors of a discoloration of phenols under certain conditions. For instance, phosphoric acid as a commonly known stabilizer (U.S. 2,752,398) inhibits a discoloration of phenol which is accelerated by contact with, or exposure to, metal surfaces, such as iron or steel, rust and/or other metal oxides. But as illustrated later, the stabilization is less effective if the phenol is also exposed to air and/or sunlight and/or additional amounts of acids or alkalies. Other stabilizers, for instance, organic polybasic carboxylic acids (U.S. 2,672,485), or Schiff's bases (British 787,859), or amino acids (British 807,736) may inhibit more or less effectively a discoloration of a phenol which is accelerated by exposure to air and/or sunlight and/or additional trace amounts of acids or alkalies. But the stabilization is considerably less effective (almost nil) if the phenol is also exposed to metal and/or metal oxides, as for instance steel, iron, rust and so forth.

It has, now, surprisingly been found that the autooxidation of phenols leading to the formation of colored compounds and/or compounds having an unpleasant odor, can be inhibited by the presence of a stabilizing amount of a trivalent arsenic compound (As (III)). According to the present invention, therefore, we provide a method of inhibiting the formation of color compounds and/or compounds having an unpleasant odor in phenols which comprises the step of adding a stabilizing amount of an inorganic trivalent arsenic (As (III)) compound alone, or in combination with other inhibitors, to the phenol.

Also, according to the present invention, there is provided a new composition which comprises a phenol which is susceptible to oxidation, leading to the formation of highly colored and/or unpleasantly odoriferous compounds, and a stabilizing amount of at least one of As (III) compounds alone, or in combination with other inhibitors.

By an As (III) compound, we mean an inorganic compound containing trivalent arsenic As (III), such as: $As_2O_3$ (arsenic trioxide), the ammonium and the alkali metal salts such as $NaAsO_2 \cdot xH_2O$ (sodium arsenite) and $KAsO_2 \cdot xH_2O$ (potassium arsenite), which is substantially soluble in phenol at the concentration used. That is, the compound does not create a visibly turbid appearance in the phenol and, of course, does not discolor the phenol in the concentrations used. Additional inorganic arsenic compounds which do not discolor and do not create a turbid appearance are arsenous acid, cesium arsenite, lithium arsenite, and alkaline earth arsenites such as magnesium arsenite. Arsenites which are substantially insoluble in the phenol in the desired concentration range, such as iron arsenite, nickel arsenite, cobalt arsenite, zinc arsenite, bismuth arsenite, calcium arsenite, barium arsenite, and aluminum arsenite are not effective and not included within the scope of this invention.

By a stabilizing amount, we mean an amount which is at most approximately 0.2 percent by weight of the phenol, preferably between about 0.001 percent and about 0.1 percent by weight. If the As (III) compound is used in combination with other inhibitors, the concentration of the total mixture will be between about 0.001 percent and about 0.2 percent by weight, preferably between about 0.002 percent and about 0.1 percent by weight of the phenol. Each inhibitor added is present in a stabilizing amount. In any event, the total stabilizer-mix is present in a stabilizing proportion. These minute amounts are surprisingly more effective in inhibiting color formation in the phenol than any one of the hitherto known stabilizers alone.

Phenols to be stabilized by the method of the present invention include, for example, monohydric phenols, such as phenol ($C_6H_5OH$), halophenols containing one to five halogen atoms, such as chlorophenol, bromophenol, dichlorophenols and dibromophenols, lower alkyl phenols, such as the isomeric cresols, and xylenols, mono- and dibutylphenols, the isomeric amylphenols and the isomeric octylphenols, nonyl phenols, and so forth, fused ring phenols, such as the naphthols, methylene and alkylidene linked bisphenols as represented by 2,2'-, 2,4'- and 4,4'-dihydroxydiphenylmethane, and 2,2 - [4,4' - dihydroxydiphenyl]propane and 1,2 - [4,4'-dihydroxydiphenyl]ethylene, and polyhydric phenols, as typified by resorcinol, pyrogallol and hydroquinone. These phenols are selected from the group consisting of phenol ($C_6H_5OH$), unsubstituted polyhydric monocyclic phenols, unsubstituted fused ring phenols, unsubstituted alkylidene linked bisphenols, their lower alkyl derivatives and their halogenated derivatives.

Some of the phenols embraced within the scope of this definition may be inherently colored materials because of chromophoric configurations, etc. However, the inorganic trivalent arsenic compound to be used will enable even the inherently colored materials to retain their color. That is, there should be no substantial change in color after a given period of time, e.g., one week.

Similarly, some of the phenols embraced within the scope of this definition may have characteristic odors. By use of the inorganic trivalent arsenic compound in the defined concentration, there is no substantial change in odor after a given period of time, e.g., one week.

It is preferred to stabilize the phenol when it is in its freshly prepared condition. However, the inorganic trivalent arsenic compound can be used to arrest further discoloration and odor formation in phenols which have already become discolored and odorous.

The trivalent arsenic compound can be added in admixture with other stabilizing compositions. A preferred stabilizer-mix of this type is a trivalent arsenic composition and a saturated aliphatic polycarboxylic acid and/or an aromatic ortho-hydroxycarboxylic acid. The saturated aliphatic polycarboxylic acids to be used contain from two to ten carbon atoms and are unsubstituted except in that they have from two to three carboxyl groups, and may also contain one or more hydroxyl substituents. Illustrative of these compounds are tartaric acid, citric acid, malic acid, malonic acid, succinic acid, suberic acid, azelaic acid, glutaric acid, adipic acid, pimelic acid, sebacic acid, oxalic acid, glyceric acid, tartronic acid, and the like acids. More than one such acid may be used.

The aromatic ortho-hydroxycarboxylic acids to be used are of the formula

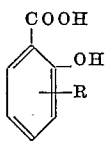

where R is selected from hydrogen, alkyl of one to five carbon atoms, and carboxyl groups. Illustrative of these compounds are salicyclic acid, 4-methylsalicyclic acid, 4-tertiary butylsalicyclic acid, hydroxyterephthalic acid and 4-hydroxyisophthalic acid; however, other acids within the defined formula may also be used. More than one such acid may be used.

Chelating agents may also be added in case of extended exposure to corroded iron surfaces. Suitable chelating agents are, for instance, ethylenediamine tetraacetic acid, or more preferably because of higher solubility 1,2-diaminocyclohexane-N,N,N',N'-tetraacetic acid.

Color measurement of commercial phenol is generally given by reference to the American Public Health Association (APHA) color scale, ranging, for instance, from zero to 70. Some commercial specifications call for phenol having a color not greater than 5 on the APHA standard. However, this scale is not sensitive enough to be used to measure the initial development of colored materials in phenol stored under various conditions. In our studies, as illustrated in the examples below, a conventional photometric technique, described, for instance, by W. West in Weissberger, Technique of Organic Chemistry, vol. 1, Part 2, p. 1399, Inter-science Publisher Inc., New York, N.Y., 1949, was used because the first slightly colored compounds formed in phenol obey Beer's law. That is, for phenol the light absorption at the wavelength of 425 m$\mu$ is a function of the concentration of these compounds and the length of the sample cell. A light filter for this wavelength is standard equipment for most commercially available electrophotometers. Thus, an APHA color of 5 is equivalent to a transmission of 95 when using an electrophomtometer containing a 425 m$\mu$ filter and a cell with a 50 millimeter light pass. For other phenols the most suitable wavelengths are somewhat different; however, at 425 m$\mu$ there is sufficient sensitivity for comparison purposes and since a color filter in this range was available, it was used in the electrophotometric measurements for those phenols as well.

Typical color stabilization effects obtained by incorporating As (III) compounds in a phenol as defined in this specification are illustrated in the following examples, which are not to be construed as limiting except as defined in the appended claims.

EXAMPLE 1

In a comparative series of tests, the compositions shown in Table I were added to phenol ($C_6H_5OH$). The stabilizers used are arsenic compounds according to this invention, and data on other compounds are given for comparison purposes. The concentration employed for all stabilizers in these series of tests was 0.01 percent by weight, i.e., 94 milligrams of total stabilizer-mix, is added to 940 grams of phenol (10 moles). In order to demonstrate effectiveness in four distinctive known areas of an accelerated discoloration, the unstabilized and the series of stabilized phenol samples (200 grams each) were mixed with:

(1) None
(2) 4 milligrams NaOH (=20 parts per million)
(3) 4 milligrams HCl (=20 parts per million)
(4) 20 grams iron nails and 4 milligrams NaOH These samples were then heated to about 100 degrees centigrade and exposed to UV-light (sun lamp), while a slow stream of air is bubbled through the phenol. The formation of color is measured every hour by reading the percentage of light transmission at 425 m$\mu$ (electrophotometer) versus freshly distilled colorless phenol, in a cell having a 50 millimeter light pass. The results for a reading after six hours are summarized in Table I.

The outstanding color stabilizing effects of the stabilizers (b)–(h) of the present invention are readily apparent from the figures in the last column of Table I.

TABLE I.—PHENOL STABILIZATION
Percent light transmission at 425 m$\mu$ (6 hours)

| Stabilizers | 1 $O_2$/UV | 2 $O_2$/UV NaOH | 3 $O_2$/UV HCl | 4 Fe/NaOH $O_2$/UV | Total 1-4 |
|---|---|---|---|---|---|
| (a) None (control) | 30 | 20 | 25 | 10 | 85 |
| (b) $As_2O_3$ | 95 | 90 | 92 | 80 | 357 |
| (c) $NaAsO_2$ | 93 | 90 | 92 | 80 | 355 |
| (d) $As_2O_3$ plus oxalic acid | 96 | 93 | 90 | 88 | 367 |
| (e) $As_2O_3$ plus citric acid | 95 | 90 | 90 | 85 | 360 |
| (f) $As_2O_3$ plus salicyclic acid | 95 | 80 | 85 | 80 | 340 |
| (g) $As_2O_3$ plus hydroxyisophthalic acid | 96 | 90 | 90 | 80 | 356 |
| (h) $As_2O_3$ plus salicyclic acid plus oxalic acid | 97 | 92 | 93 | 88 | 370 |
| (i) Citric acid | 78 | 50 | 40 | 60 | 228 |
| (j) Phosphoric acid | 80 | 60 | 60 | 80 | 280 |
| (k) DL-alanine | 50 | 50 | 50 | 30 | 180 |
| (l) Disalicyclidene ethylenediamine | 50 | 40 | 40 | 20 | 150 |

EXAMPLE 2

In a manner similar to that described in Example 1, portions of freshly distilled o-cresol were mixed with 0.01 percent by weight of stabilizers shown in Table II. The color stability expressed as percent light transmission after two hours exposure is summarized in Table II.

TABLE II.—o-CRESOL STABILIZATION
Percent light transmission at 425 m$\mu$ (2 hours)

| Stabilizers | 1 $O_2$/UV | 2 $O_2$/UV NaOH | 3 $O_2$/UV HCl | 4 Fe/NaOH $O_2$/UV | Total 1-4 |
|---|---|---|---|---|---|
| (a) None (control) | 30 | 10 | 10 | 10 | 60 |
| (b) $As_2O_3$ | 85 | 80 | 80 | 70 | 315 |
| (c) $As_2O_3$ plus oxalic acid | 90 | 80 | 85 | 80 | 335 |
| (d) $As_2O_3$ plus salicyclic acid | 80 | 70 | 75 | 75 | 300 |
| (e) Phosphoric acid | 42 | 35 | 35 | 30 | 142 |
| (f) Citric acid | 40 | 30 | 30 | 20 | 120 |

EXAMPLE 3

In a manner similar to that described in Example 1, portions of freshly distilled o-chlorophenol were mixed with 0.01 percent by weight of stabilizers as indicated in Table III. The color stability expressed as percent light transmission is shown in Table III. Here too, the outstanding color stabilizing effects under the conditions chosen, are readily seen in the last column of the table.

TABLE III.—o-CHLOROPHENOL STABILIZATION

Percent light transmission at 425 mμ (6 hours)

| Stabilizers | 1<br>O₂/UV | 2<br>O₂/UV<br>NaOH | 3<br>O₂/UV<br>HCl | 4<br>Fe/NaOH<br>O₂/UV | Total<br>1-4 |
|---|---|---|---|---|---|
| (a) None (control) | 30 | 30 | 30 | 20 | 115 |
| (b) As₂O₃ | 90 | 80 | 80 | 70 | 320 |
| (c) As₂O₃ plus oxalic acid | 92 | 85 | 90 | 80 | 347 |
| (d) As₂O₃ plus hydroxyiso-phthalic acid | 92 | 80 | 80 | 70 | 322 |
| (e) Phosphoric acid | 50 | 40 | 45 | 45 | 180 |
| (f) Citric acid | 40 | 35 | 40 | 40 | 155 |

Those skilled in the art will see modifications which can be made without departing from the scope of this invention. The invention described herein is not to be limited except as by the appended claims.

We claim:

1. A phenol containing an inorganic trivalent arsenic compound that in the concentrations used is substantially soluble, does not create a visible turbid appearance in the phenol and does not discolor the phenol, present in a stabilizing proportion, said phenol being selected from the group consisting of monohydric phenols, polyhydric phenols, halophenols containing one to five halogen atoms, lower alkyl phenols, fused ring phenols, and alkylidene linked bisphenols and the said trivalent arsenic compound is selected from the group consisting of arsenic trioxide, ammonium arsenite, alkali metal arsenites, alkaline earth arsenites and arsenous acid.

2. The phenol of claim 1 wherein the proportion of the trivalent arsenic compound is from about 0.001 percent to about 0.2 percent by weight of the phenol.

3. The phenol of claim 1 wherein the proportion of the trivalent arsenic compound is from about 0.002 percent to about 0.1 percent by weight of the phenol.

4. The phenol of claim 1 stabilized with arsenic trioxide.

5. The phenol of claim 1 stabilized with sodium arsenite.

6. The phenol of claim 1 stabilized with an alkali metal arsenite.

7. The phenol of claim 6 stabilized with potassium arsenite.

8. Phenol (C₆H₅OH) stabilized with arsenic trioxide in a stabilizing proportion.

9. Phenol (C₆H₅OH) stabilized with sodium arsenite in a stabilizing proportion.

10. o-Cresol stabilized with arsenic trioxide in a stabilizing proportion.

11. o-Chlorophenol stabilized with arsenic trioxide in a stabilizing proportion.

12. A phenol mixture according to claim 1 additionally containing an organic acid selected from an aromatic ortho-hydroxycarboxylic acid of the formula

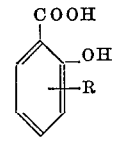

where R is selected from the group consisting of hydrogen, alkyl of one to five carbon atoms, and carboxyl groups, and a saturated aliphatic polycarboxylic acid containing from two to ten carbon atoms and is unsubstituted except in that it has from two to three carboxyl groups and may also contain one or more hydroxyl substituents, and mixtures thereof, each acid and arsenic compound in the combination present being in a stabilizing proportion.

13. The phenol according to claim 12 stabilized with a mixture of arsenic trioxide and oxalic acid.

14. The phenol according to claim 12 stabilized with a mixture of arsenic trioxide and citric acid.

15. The phenol according to claim 12 stabilized with a mixture of arsenic trioxide and hydroxyisophthalic acid.

16. The phenol according to claim 12 stabilized with a mixture of arsenic trioxide, salicyclic acid and oxalic acid.

17. Phenol (C₆H₅OH) stabilized with a mixture of arsenic trioxide and oxalic acid.

18. Phenol (C₆H₅OH) stabilized with a mixture of arsenic trioxide and citric acid.

19. Phenol (C₆H₅OH) stabilized with a mixture of arsenic trioxide and hydroxyisophthalic acid.

20. Phenol (C₆H₅OH) stabilized with a mixture of arsenic trioxide, salicyclic acid and oxalic acid.

References Cited

UNITED STATES PATENTS 2,672,485   3/1954   Menn et al. _____ 260—621 A
3,234,290   2/1966   Rocklin _____ 260—619 A BERNARD HELFIN, Primary Examiner U.S. Cl. X.R.

260—619 A, 619 R, 623 R, 624 A